US012289577B2

(12) United States Patent
Li et al.

(10) Patent No.: US 12,289,577 B2
(45) Date of Patent: Apr. 29, 2025

(54) ACOUSTIC DEVICES

(71) Applicant: SHENZHEN SHOKZ CO., LTD., Guangdong (CN)

(72) Inventors: Chaowu Li, Shenzhen (CN); Huifang Tang, Shenzhen (CN); Bingyan Yan, Shenzhen (CN); Bocheng Li, Shenzhen (CN); Shuailin Xie, Shenzhen (CN); Fen You, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 415 days.

(21) Appl. No.: 18/045,471

(22) Filed: Oct. 11, 2022

(65) Prior Publication Data

US 2023/0053556 A1 Feb. 23, 2023

Related U.S. Application Data

(63) Continuation of application No. PCT/CN2021/090973, filed on Apr. 29, 2021.

(30) Foreign Application Priority Data

Aug. 12, 2020 (CN) ......................... 202021675913.0
Aug. 12, 2020 (CN) ......................... 202021693233.1
Aug. 12, 2020 (CN) ......................... 202021693284.4

(51) Int. Cl.
*H04R 1/24* (2006.01)
*H04R 1/02* (2006.01)
*H04R 1/10* (2006.01)

(52) U.S. Cl.
CPC ............ *H04R 1/105* (2013.01); *H04R 1/023* (2013.01)

(58) Field of Classification Search
CPC . H04R 1/24; H04R 1/26; H04R 1/326; H04R 1/342; H04R 1/406; H04R 1/1041
See application file for complete search history.

(56) References Cited

U.S. PATENT DOCUMENTS 5,764,778 A * 6/1998 Zurek .................. H04R 25/407 381/313
6,766,032 B1 * 7/2004 Lee .......................... H04R 1/08 381/357

(Continued)

FOREIGN PATENT DOCUMENTS

CN 208489977 U 2/2019
CN 111432053 A 7/2020

(Continued)

OTHER PUBLICATIONS

International Search Report in PCT/CN2021/090973 mailed on Jul. 19, 2021, 8 pages.

(Continued)

*Primary Examiner* — Ryan Robinson
(74) *Attorney, Agent, or Firm* — Metis IP LLC

(57) ABSTRACT

This present disclosure provides an acoustic device. The acoustic device includes a housing, one or more sound pickup assemblies, and one or more channel assemblies. The housing has an accommodating space and one or more communication holes. Each communication hole communicates the accommodating space and an outside space. The one or more sound pickup assemblies may be disposed in the accommodating space for picking up a sound through the communication holes. The one or more channel assemblies may be disposed in the accommodating space. At least one of the one or more channel assemblies is disposed between one sound pickup assembly of the one or more pickup assemblies and one communication hole of the one or more communication holes, so that the sound is transmitted to the (Continued)

sound pickup assembly through the at least one of the one or more channel assemblies after passing through the communication hole.

17 Claims, 9 Drawing Sheets

(56) References Cited

U.S. PATENT DOCUMENTS

| | | | | |
|---|---|---|---|---|
| 8,325,959 | B2 * | 12/2012 | Kargus, IV | H04R 1/38 381/337 |
| 8,908,897 | B2 * | 12/2014 | Lee | B29C 66/54 381/385 |
| 9,031,256 | B2 * | 5/2015 | Visser | H04R 3/005 381/92 |
| 9,232,366 | B1 | 1/2016 | Charlier et al. | |
| 9,467,780 | B2 | 10/2016 | Kelly et al. | |
| 9,843,659 | B2 | 12/2017 | Yamaguchi et al. | |
| 10,368,152 | B2 * | 7/2019 | Christiansen | H04R 1/406 |
| 2003/0173145 | A1 * | 9/2003 | Groth | H04R 1/083 381/338 |
| 2007/0177752 | A1 | 8/2007 | Kargus | |
| 2013/0251183 | A1 | 9/2013 | Doller et al. | |
| 2017/0185373 | A1 | 6/2017 | Kim et al. | |
| 2018/0176670 | A1 | 6/2018 | Nakatsukasa | |
| 2018/0324511 | A1 * | 11/2018 | Asada | H04R 3/005 |
| 2019/0069104 | A1 | 2/2019 | Lindberg | |
| 2019/0141428 | A1 | 5/2019 | Gampe | |
| 2019/0189106 | A1 | 6/2019 | Hull et al. | |
| 2020/0129760 | A1 | 4/2020 | Baker et al. | |
| 2021/0067879 | A1 | 3/2021 | Li et al. | |
| 2022/0021960 | A1 | 1/2022 | Li et al. | |

FOREIGN PATENT DOCUMENTS

| | | | |
|---|---|---|---|
| CN | 212851007 | U | 3/2021 |
| JP | H01149694 | A | 6/1989 |
| JP | 2005286919 | A | 10/2005 |
| JP | 2007028401 | A | 2/2007 |
| JP | 2015012436 | A | 1/2015 |
| JP | 2015056837 | A | 3/2015 |
| WO | 2018074005 | A1 | 4/2018 |

OTHER PUBLICATIONS

The Extended European Search Report in European Application No. 21855136.4 mailed on Sep. 29, 2023, 12 pages.

Decision of Grant in Russian Application No. 2022127211 mailed on Jun. 16, 2023, 22 pages.

Notice of Preliminary Rejection in Korean Application No. 10-2022-7041657 mailed on Nov. 30, 2023, 10 pages.

Notice of Rejection in Japanese Application No. 2022-569605 mailed on Dec. 18, 2023, 8 pages.

* cited by examiner

ACOUSTIC DEVICES

CROSS REFERENCE TO RELATED APPLICATIONS

This application is a continuation of International Patent Application No. PCT/CN2021/090973, filed on Apr. 29, 2021, which claims priority of Chinese Patent Application No. 202021675913.0, filed on Aug. 12, 2020, Chinese Patent Application No. 202021693284.4, filed on Aug. 12, 2020, and Chinese Patent Application No. 202021693233.1, filed on Aug. 12, 2020, the entire contents of each of which are incorporated herein by reference.

TECHNICAL FIELD

The present disclosure generally relates to the technical field of electronic equipment, and in particular, to an acoustic device.

BACKGROUND

Bone conduction earphones can convert a sound into mechanical vibrations with different frequencies, and transmit the mechanical vibrations to the auditory nerve using human bones/tissues as a medium to transmit the mechanical vibrations. Thus, the user can hear the sound without using the external auditory canal and tympanic membrane of the ear. For a hearing-impaired user (e.g., a user with normal hearing in one ear and impaired hearing in the other ear), due to his/her hearing is damaged or degraded, a bone conduction earphone with higher acoustic performance (e.g., with better sound pickup effect), and better functional structure (e.g., having a volume control function that matches his/her hearing conditions) is required. Therefore, it is desirable to provide an acoustic device with higher acoustic performance and better functional structure to meet the needs of users.

SUMMARY

According to an aspect of the present disclosure there is provided an acoustic device. The acoustic device may include a housing having an accommodating space and one or more communication holes. Each communication hole communicates the accommodating space and an outside space. One or more sound pickup assemblies are disposed in the accommodating space and configured to pick up a sound through the communication hole, and one or more channel assemblies are disposed in the accommodating space, wherein at least one of the one or more channel assemblies is disposed between a sound pickup element in the one or more pickup sound assemblies and a communication hole in the one or more communication holes, so that the sound is transmitted to the sound pickup element through at least one of the one or more channel assemblies after passing through the communication hole.

In some embodiments, at least one of the one or more channel assemblies includes a first hole, a channel, and a second hole. The first hole is in butt communication with the communication hole. The second hole is disposed adjacent to the sound pickup assembly so that the sound is transmitted to the sound pickup assembly through the communication hole, the first hole, the channel, and the second hole in sequence.

In some embodiments, an accommodating groove is disposed in the accommodating space for accommodating at least one of the one or more sound pickup assemblies. At least one of the channel assemblies presses at least one of the sound pickup assemblies in the accommodating groove.

In some embodiments, the housing may include a first housing and a second housing, and the first housing and the second housing are matched and connected to form the accommodating space. The second housing includes a bottom wall and a side wall ringed around the bottom wall; the first housing is physically connected to the side wall to form the accommodating space, and the bottom wall protrudes toward one side of the first housing and is provided with a flange surrounding the accommodating groove, the at least one channel assembly is covered on the flange to hold the sound pickup assembly in the accommodating groove.

In some embodiments, the channel may include a channel top wall, a channel bottom wall, and a channel side wall, the channel top wall and the channel bottom wall are respectively located at two ends of the channel side wall. The first hole is disposed on the channel side wall or the channel top wall. The second hole is disposed on the channel bottom wall; and the channel bottom wall is configured to press and hold the sound pickup assembly.

In some embodiments, the sound pickup assemblies may comprise a sound pickup element and a protective cover, the protective cover is sleeved on the outer periphery of the sound pickup element. The protective cover is provided with a groove facing the channel bottom wall. The sound pickup element is at least partially located in the groove; and the protective cover abuts and fits with the flange.

In some embodiments, a length of the channel in a direction connecting the channel top wall and the channel bottom wall is in a range of 0.45-0.75 mm.

In some embodiments, a distance from the first hole to the second hole along the channel is greater than or equal to 4 mm.

In some embodiments, the first hole may have a same shape as the communication hole.

In some embodiments, the acoustic device may further comprise a protective component, which is provided between the at least one channel assembly and the housing to space the communication hole and the first hole apart.

In some embodiments, the protective component may include a first mesh and a second mesh arranged in layers, the second mesh being closer to the at least one channel assembly than the first mesh.

In some embodiments, the acoustic device may also include multiple speaker assemblies, a control circuit assembly and multiple interactive assemblies. The control circuit assembly may include multiple control elements, each control element corresponding to at least one speaker assembly in the multiple speaker assemblies. Each interactive assembly corresponds to each of the multiple speaker assemblies and its corresponding control element, the interactive assembly is configured to trigger the control element corresponding to the interactive assembly to control the corresponding speaker assembly to implement a function corresponding to a user operation instruction in response to receiving the user operation instruction.

In some embodiments, the function may include each of the multiple control elements independently controlling the audio gain of its corresponding speaker assembly.

In some embodiments, the interactive assembly may include one or more third holes disposed on the housing and buttons disposed in the third holes respectively, for triggering the control element to adjust the audio gain of the corresponding speaker assembly.

In some embodiments, at least one of the one or more communication holes may be disposed on a side of the housing away from at least one speaker assembly of the multiple speaker assemblies.

In some embodiments, the housing may include a first part and one end of the second part are respectively connected to one speaker assembly. The control circuit assembly may include a main circuit board, the control element is integrated on the main circuit board, and the main circuit board is accommodated in an accommodating space corresponding to an ear-hook housing. The control circuit assembly may also include a sub-circuit board, which is disposed in an accommodating space corresponding to the other ear-hook housing and covers a corresponding volume button hole.

In some embodiments, the housing may also include a third part, the third part is connected between the first part and the second part. The one or more sound pickup assemblies may be respectively disposed in at least two corresponding accommodating spaces of the first part, the second part, and the third part. In some embodiments, the one or more sound pickup assemblies may be disposed in the corresponding accommodating space of the third part at intervals.

In some embodiments, the one or more sound pickup assemblies may be disposed in the corresponding accommodation space of the third part, one of the sound pickup assemblies may be disposed at a middle position of the corresponding accommodating space of the third part, and the remaining sound pickup assemblies may be spaced on one side or both sides of the middle position.

In some embodiments, the one or more sound pickup assemblies may include two sound pickup assemblies and the one or more channel assemblies include two channel assemblies. The two sound pickup assemblies and the two channel assemblies may be respectively disposed in the two ear-hook housings.

According to another aspect of the present disclosure there is provided an acoustic device. The acoustic device may include multiple speaker assemblies, a control circuit assembly, and multiple interactive assemblies. The control circuit assembly may include multiple control elements, each control element corresponding to at least one speaker assembly in the multiple speaker assemblies. Each interactive assembly corresponds to each of the multiple speaker assemblies and the corresponding control element of the speaker assembly, the interactive assembly is configured to trigger the control element corresponding to the interactive assembly to control the corresponding speaker assembly to implement a function corresponding to a user operation instruction in response to receiving the user operation instruction.

Additional features will be set forth, in part, in the following present disclosure, and will become apparent to those skilled in the art upon review of the following content and drawings, or may be learned by the creation or operation of an example. The features of the present disclosure can be realized and obtained by practicing or using the various aspects of the methods, tools and combinations set forth in the following detailed examples.

BRIEF DESCRIPTION OF THE DRAWINGS

The present disclosure may be further described in accordance with exemplary embodiments. The exemplary embodiments may be described in detail with reference to the accompanying drawings. The described embodiments are not limiting example embodiments, wherein like reference numerals refer to similar structures throughout the several views of the drawings, and wherein.

DETAILED DESCRIPTION

Figure 1:
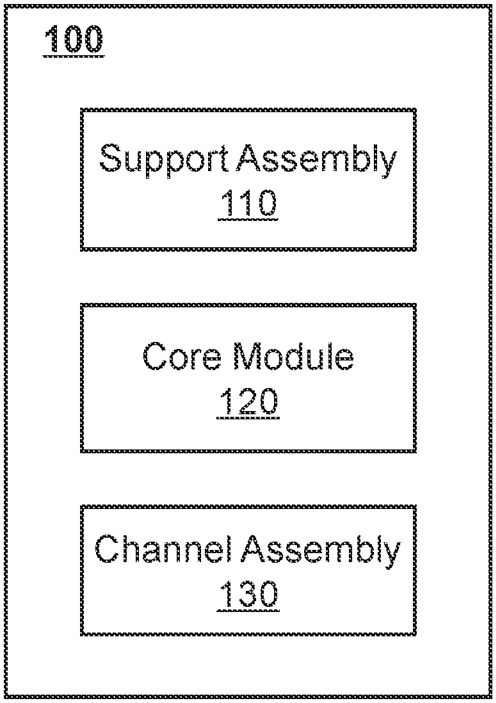
FIG. 1 is a block diagram illustrating an exemplary acoustic device according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

As used in the disclosure and the appended claims, the singular forms “a,” “an,” and “the” may be intended to include the plural forms as well, unless the context clearly indicates otherwise. In general, the terms “comprise,” “comprises,” and/or “comprising,” “include,” “includes,” and/or “including,” merely prompt to include steps and elements that have been clearly identified, and these steps and elements do not constitute an exclusive listing. The methods or devices may also include other steps or elements.

It should be understood that the terms “data block,” “system,” “engine,” “unit,” “assembly,” “module” and/or “block” are used as a method to distinguish between different assemblies, elements, sections and parts at different levels. However, other words may be replaced by other expressions if they serve the same purpose.

Various terms are used to describe the spatial and functional relationships between elements (e.g., between layers). The terms include “connected,” “bonded,” “interfaced,” “coupled,” etc. Unless explicitly described as “direct,” when describing the relationship between a first and second elements in this present disclosure, the relationship includes a direct relationship between the first and second elements without other intervening elements, as well as an indirect relationship between the first and second elements with one or more intervening elements (spatially or functionally). In contrast, when an element is referred to as being "directly" connected, joined, interfacing, or coupled to another element, there are no intervening elements present. Additionally, the spatial and functional relationships between elements may be implemented in various ways. For example, the mechanical connection between the two elements may comprise a welded connection, a keyed connection, a pinned connection, an interference fit connection, etc., or any combination thereof. Other words used to describe the relationship between the elements should be interpreted in a similar way (e.g., "between," "with," "adjacent," and "directly adjacent," etc.).

The present disclosure provides an acoustic device. The acoustic device may include a housing, one or more sound pickup assemblies, and one or more channel assemblies. The housing may have an accommodating space and one or more communication holes. Each communication hole communicates the accommodating space and an outside space. The one or more sound pickup assemblies may be disposed in the accommodating space and be configured to pick up a sound through the communication holes. The one or more channel assemblies may be disposed in the accommodating space. At least one of the one or more channel assemblies is disposed between a sound pickup assembly in the one or more pickup sound assemblies and a communication hole of the one or more communication holes, so that the sound is transmitted to the sound pickup assembly through the at least one of the one or more channel assemblies after passing through the communication hole. Therefore, by disposing the one or more channel assemblies, a sound path of the corresponding sound pickup assembly can be extended, thereby weakening the "wind noise" phenomenon caused by the short sound path of the sound pickup assembly. In addition, in some embodiments, by disposing multiple sound pickup assemblies that can independently perform sound pickup and signal processing (e.g., amplification), is the acoustic device may also be possible to adapt to sounds from different directions, which enables a wearer (for example, the hearing-impaired user) to adapt to sounds in different directions and improves the wearer's hearing effect.

In some embodiments, the acoustic device may also include multiple speaker assemblies, a control circuit assembly, and multiple interactive assemblies. The control circuit assembly may include multiple control elements. Each control element may correspond to at least one speaker assembly of the multiple speaker assemblies. Each interactive assembly corresponds to one of the multiple speaker assemblies and the corresponding control element of the speaker assembly. The interactive assembly is configured to trigger the control element corresponding to the interaction assembly to control the corresponding speaker assembly to implement a function corresponding to a user operation instruction in response to receiving the user operation instruction. Therefore, for a hearing-impaired person (e.g., a user with normal hearing in one ear and impaired hearing in the other ear), he/she can adjust two speaker assemblies adaptively according to actual requirements to adapt to the different hearings of his/her two ears, so as to avoid the sound that is always heard "big on one side and small on the other side," thereby improving the user's experience.

FIG. 1 is a block diagram illustrating an exemplary acoustic device according to some embodiments of the present disclosure. The acoustic device 100 may pick up a user's voice, an ambient sound of the environment where the user is located, etc., and convert the pickup sound into an audio signal (e.g., an electrical signal). In some embodiments, the acoustic device 100 may include hearing aids, earphones (e.g., noise-cancelling earphones, bone conduction earphones), listening bracelets, smart glasses, mobile phones, microphones, and other devices with sound pickup capabilities. As shown in FIG. 1, the acoustic device 100 may include a support assembly 110, a core module 120, and a channel assembly 130.

The support assembly 110 may have an accommodating space and a housing, and one or more communication holes are provided on the housing. The communication holes may communicate with the accommodating space and the outside space. In some embodiments, one or more components of the acoustic device 100 may be disposed in the accommodating space. For example, the core module 120 and the channel assembly 130 may be located in the accommodating space. As another example, the core module 120 may include multiple sound pickup assemblies. The multiple sound pickup assemblies may be disposed in the accommodating space at intervals.

In some embodiments, the housing may include a first housing and a second housing. The first housing and the second housing may be cooperated to form the accommodating space. The second housing may include a bottom wall and a side wall ringed around the bottom wall. The first housing may be physically connected to the side wall to form the accommodating space. In some embodiments, a flange may be protruded from a side of the bottom wall facing the first housing, so as to enclose an accommodating groove for accommodating the sound pickup assembly. The channel assembly 130 may be covered on the flange to hold the sound pickup assembly in the accommodating groove. In the present disclosure, the channel assembly pressing the sound pickup assembly in the accommodating groove may refer that a certain surface of the channel assembly and the accommodating groove may form an accommodating cavity, when the sound pickup assembly is placed in the accommodating cavity, the sound pickup assembly may fit with the side wall of the accommodating cavity.

Figure 2:
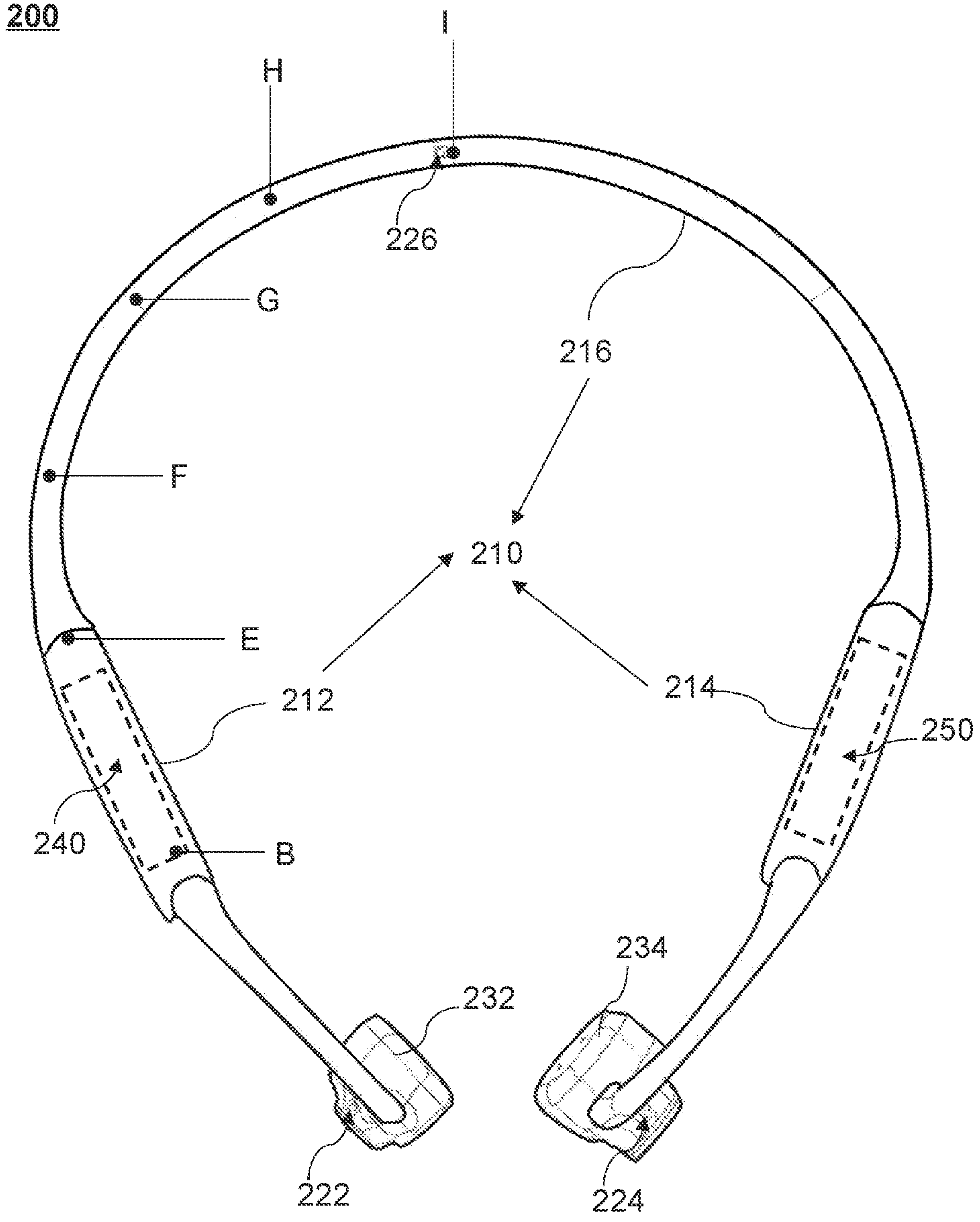
FIG. 2 is a structural diagram of an exemplary acoustic device according to some embodiments of the present disclosure.
Figure 3:
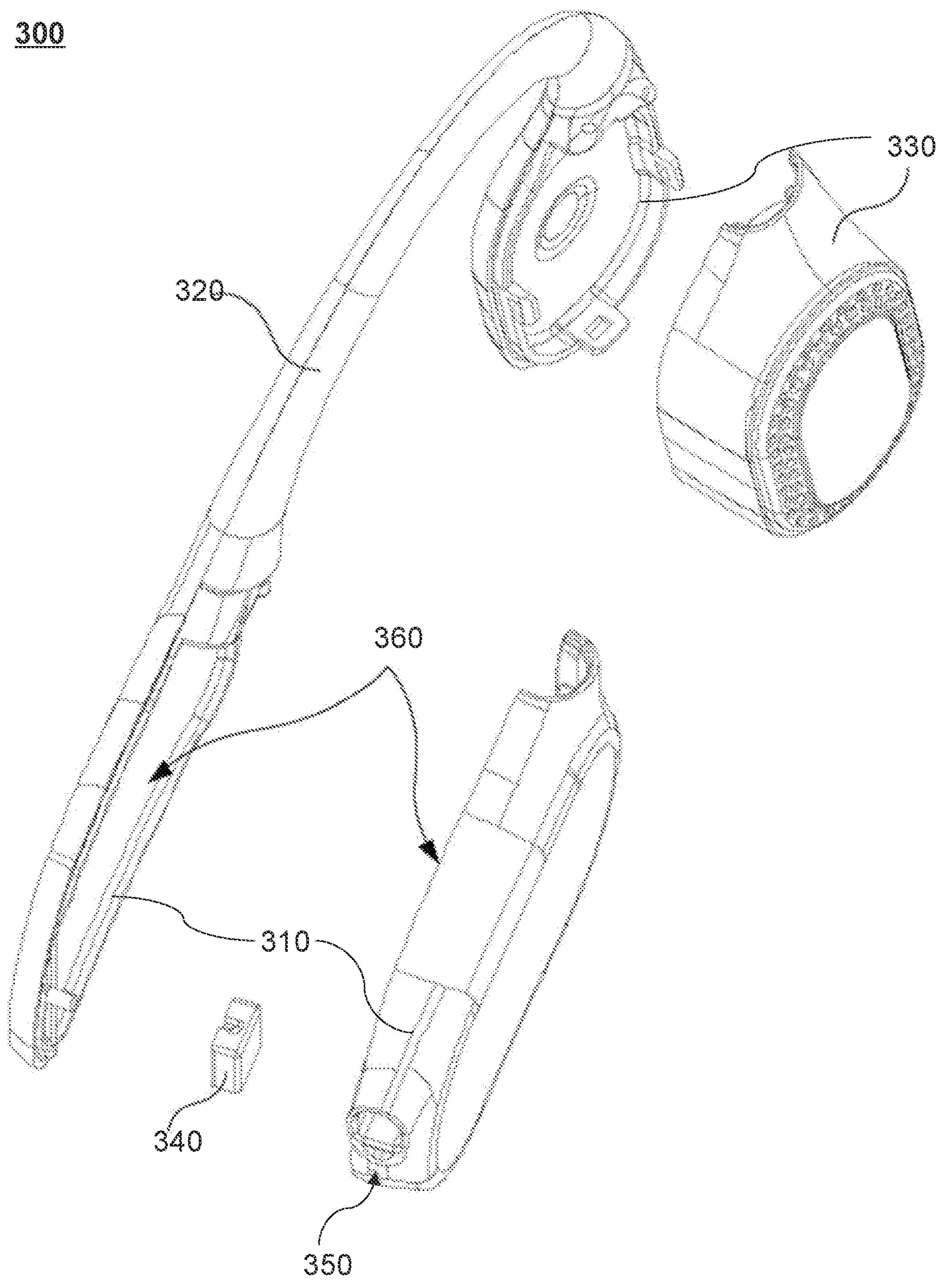
FIG. 3 is a structural diagram of an exemplary ear-hook assembly according to some embodiments of the present disclosure.
Figure 4:
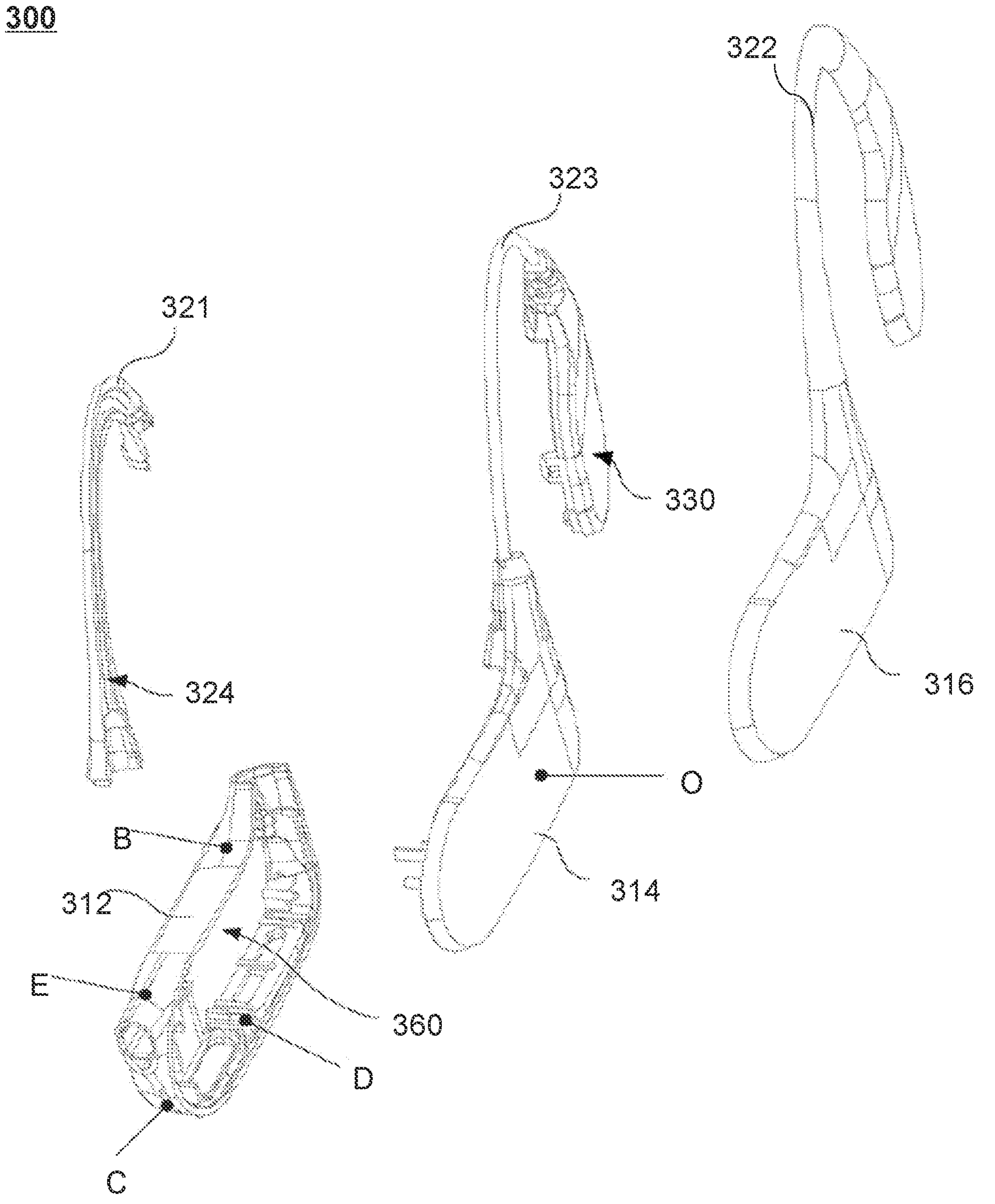
FIG. 4 is an exploded diagram of the ear-hook assembly in FIG. 3.

In some embodiments, the shape of the support assembly 110 (e.g., the housing) may be set according to specific usage requirements of the acoustic device 100, which is not specifically limited here. For example, the acoustic device 100 may be a bone conduction hearing aid, and the support assembly 110 thereof may cooperate with the user's auricle, so that the bone conduction hearing aid can be hung on the user's ear and not easily dropped. The bone conduction hearing aid with the support assembly 110 may also be called an ear-hook hearing aid. As another example, the acoustic device 100 may be an open binaural earphone. The support assembly 110 may be hung horizontally on the top of the user's head, that is, fixed on the user's head in a form similar to a headband, and its two ends are at a certain distance from the user's ears. As still another example, the support assembly 110 may be a structure as shown in FIG. 2, which includes a first part 212, a second part 214, and a third part 216. In some embodiments, the first part 212 and the second part 214 may also be referred to as ear-hook assemblies. The third part 216 may also be referred to as a rear-hook assembly. For more descriptions about the ear-hook assembly and/or the rear-hook assembly, please refer to other places in the present disclosure (e.g., as shown in FIGS. 2, 3, and 4 and their related descriptions).

In some embodiments, the support assembly 110 may be made of metallic materials (e.g., copper, aluminum, titanium, gold, etc.), alloy materials (e.g., aluminum alloys, titanium alloys, etc.), plastic materials (e.g., polyethylene, polypropylene, epoxy, nylon, etc.), fiber material (e.g., acetate fiber, propionate fiber, carbon fiber, etc.), etc. In some embodiments, the support assembly 110 may be disposed with a protective cover outside. The protective cover may be made of a soft material with certain elasticity, such as soft silicone, rubber, etc., to provide a better tactile feeling for the user to wear.

The core module 120 may include a sound pickup assembly. The sound pickup assembly may be used to pick up a sound (i.e., mechanical vibration signals) through a communication hole on the surface of the housing, and convert the picked up sound into an audio signal (e.g., an electrical signal). In some embodiments, the acoustic device 100 may transmit the audio signal to other acoustic devices, such as speakers, trumpets, or the like. In some embodiments, the acoustic device 100 may transmit the audio signal to other assemblies in the acoustic device 100, for example, the core module 120 may further include a speaker assembly, so as to convert the audio signal into mechanical vibration signals through the speaker assembly, and transmit them to the auditory nerve through the wearer's bones, thereby achieving the hearing aid function. In some embodiments, the speaker assembly may be physically connected to other components, e.g., the support assembly 110, the sound pickup assembly, of the acoustic device 100. Merely by way of example, the physical connection may include injection-molded connection, welding, riveting, bolting, gluing, snap-fitting, or the like, or any combination thereof. In some embodiments, the sound pickup assembly may include one or more microphones (e.g., a microphone array). In some embodiments, the acoustic device 100 may include multiple sound pickup assemblies. Each sound pickup assembly may correspond to one communication hole. The multiple sound pickup assemblies may be disposed in the housing at intervals. For more descriptions regarding the placement positions of the multiple sound pickup assemblies, please refer to other places in this application (e.g., FIG. 2 and FIG. 7 and their descriptions).

The channel assembly 130 may be disposed in the accommodating space. In some embodiments, the channel assembly 130 may be disposed between the sound pickup assembly and the communication hole, so that the sound is transmitted to the sound pickup assembly through the channel assembly 130 after passing through the communication hole. In some embodiments, at least one of the one or more sound pickup assemblies may correspond to one channel assembly 130, so as to improve the sound pickup effect of the corresponding sound pickup assembly. In some embodiments, the channel assembly 130 may include a first hole (which may also be referred to as a sound inlet hole), a channel, and a second hole (which may also be referred to as a sound outlet hole). In some embodiments, the first hole and the communication hole may be in butt communication, and the second hole may be disposed adjacent to the sound pickup assembly so that the sound is transmitted to the sound pickup assembly through the communication hole, the first hole, the channel, and the second hole in sequence. For more descriptions about the channel assembly, please refer to other places in this present disclosure (e.g., FIGS. 6A-6B and their associated descriptions).

In some embodiments, the acoustic device 100 may also include a control circuit assembly and one or more interactive assemblies (not shown). The control circuit assembly may be used to control the acoustic device 100, such as volume control, on/off control, operating mode selection (e.g., play/pause), wireless connection, data transfer control, or the like. In some embodiments, the control circuit assembly may include multiple control elements. Each control element may correspond to at least one speaker assembly of the multiple speaker assemblies. Each interactive assembly may correspond to one speaker assembly and its corresponding control element. Each interactive assembly may be configured to receive a user operation instruction, and trigger the control element corresponding to the interactive assembly to control the corresponding speaker assembly to implement the function corresponding to the user operation instruction. For more descriptions about the control circuit assembly and the interactive assembly, please refer to other places in this present disclosure (e.g., FIGS. 8 and 9 and their related descriptions).

In some embodiments, the acoustic device 100 may also include a protective assembly (not shown). In some embodiments, the protective assembly may have a function, for example, waterproof and dustproof functions, of protecting the acoustic device 100. In some embodiments, the protective assembly may be disposed within and physically connected to the support assembly 110 to form a protective barrier that protects the acoustic device 100. For example, the core module 120 may be disposed in the accommodating space of the housing of the support assembly 110, the protective assembly may be disposed between the core module 120 and the housing of the support assembly 110 to form the protective barrier for protecting the core module 120, so as to achieve the waterproof and dustproof functions.

It should be noted that the above description of the acoustic device 100 is intended to be illustrative, not to limit the scope of the present disclosure. Numerous alternatives, modifications and variations will be apparent to those of ordinary skill in the art. The features, structures, methods, and other features of the exemplary embodiments described herein may be combined in various ways to obtain additional and/or alternative exemplary embodiments. In some embodiments, the acoustic device 100 may also include a battery assembly, a Bluetooth assembly, or the like, or a combination thereof. The battery assembly may be used to power the acoustic device 100. The Bluetooth assembly may be used to wirelessly connect the acoustic device 100 to other devices (e.g., cell phones, computers, etc.).

FIG. 2 is a structural diagram of an exemplary acoustic device according to some embodiments of the present disclosure. As shown in FIG. 2, the acoustic device 200 may include a support assembly 210, one or more sound pickup assemblies (e.g., sound pickup assemblies 222, 224, and 226), two speaker assemblies (e.g., speaker assemblies 232 and 234), a battery assembly 240, and a control circuit assembly 250.

The support assembly 210 may include a first part 212 (i.e., an ear-hook assembly 212), a second part 214 (i.e., an ear-hook assembly 214), and a third part 216 (i.e., a rear-hook assembly 216). Two ends of the rear-hook assembly 216 may be respectively connected to one end of the two ear-hook assemblies (i.e., the ear-hook assembly 212 and the ear-hook assembly 214). When the user wears the acoustic device 200, the ear-hook assembly 212 and the ear-hook assembly 214 may be respectively hung on the user's ears, and the rear-hook assembly 216 may be provided around the back of the user's head or neck, so that the acoustic device 200 can be stably worn.

In some embodiments, the speaker assemblies 232 and 234 may be used to convert an audio signal (e.g., an electrical signal) into mechanical vibrations with different frequencies. The two speaker assemblies (i.e., the speaker assemblies 232 and 234) may be disposed at the other ends of the two ear-hook assemblies. For example, the ear-hook assembly 212 and the ear-hook assembly 214 may respectively include accommodating spaces, the speaker assembly 232 may be disposed in the accommodating space of the ear-hook assembly 212, and the speaker assembly 234 may be disposed in the accommodating space of the ear-hook assembly 214. When the acoustic device 200 is worn, the two speaker assemblies may transmit mechanical vibrations to the human auditory system through the wearer's bones and/or cochlea, thereby allowing the wearer to hear sound. In some embodiments, the speaker assemblies 232 and/or 234 may be existed independently with respect to the ear-hook assemblies. That is, the speaker assemblies 232 and/or 234 may include speaker housings. The speaker housings may be connected to the ear-hook assemblies 212 and/or 214, and the speaker assemblies 232 and/or 234 may be disposed outside the ear-hook assemblies 212 and 214. For more descriptions about the ear-hook assemblies, please refer to FIGS. 3-4 and the detailed descriptions thereof.

In some embodiments, one or more components of the acoustic device 200 may be disposed within the accommodating space formed by the support assembly 210. For example, as shown in FIG. 2, the battery assembly 240 may be disposed in an accommodating space of the ear-hook assembly 212. The control circuit assembly 250 may be disposed in an accommodating space of the ear-hook assembly 214. As another example, the battery assembly 240 and/or the control circuit assembly 250 may be disposed in the rear-hook assembly 216. As a further example, the acoustic device 200 may also include a Bluetooth assembly. The Bluetooth assembly may be disposed in an accommodating space of the rear-hook assembly 216. As still another example, the acoustic device 200 may also include one or more channel assemblies. At least one of the one or more channel assemblies may be disposed between at least one of the one or more sound pickup assemblies and one of the one or more communication holes on the support assembly 210. For more description about the channel assembly, please refer to descriptions elsewhere in this present disclosure (e.g., FIGS. 6A-6B and the detailed descriptions).

In some embodiments, the acoustic device 200 may include multiple (e.g., 2, 3, 4, 5, etc.) sound pickup assemblies. Each sound pickup assembly may be disposed near the communication hole on the support assembly 210, so that the sound pickup assembly can pick up sound through the corresponding communication hole. The multiple sound pickup assemblies may be independent of each other, and may independently perform sound pick up and signal amplification, so as to independently pick up and process sounds from different directions, which enables the wearer (for example, the hearing-impaired user) to adapt to sounds in different directions and improves the wearer's hearing experience. In some embodiments, the multiple sound pickup assemblies may be spaced at different positions of the support assembly 210. For example, the multiple sound pickup assemblies may be spaced in the rear-hook assembly 216 (e.g., positions F, G, H, I). As another example, one of the multiple sound pickup assemblies may be disposed at a middle position (i.e., position I) of the rear-hook assembly 216, and the other sound pickup assemblies may be disposed on one side or both sides of the middle position at intervals. As a further example, the multiple sound pickup assemblies may be disposed in the ear-hook assemblies 212 and/or 214 at intervals. As still another example, part of the multiple sound pickup assemblies may be disposed in one ear-hook assembly at intervals (e.g., positions E and B in FIG. 2 and/or positions O and D in FIG. 4), the remaining parts may be disposed in the rear-hook assembly 216 at intervals. In some embodiments, when the speaker assembly exists independently, the multiple sound pickup assemblies may also be disposed within the speaker housing. In some embodiments, part of the multiple sound pickup assemblies may be disposed in the support assembly 210 at intervals, and the rest may be disposed in the speaker housing at intervals. In some embodiments, a position of a sound pickup assembly may also be referred to as a position of its corresponding communication hole.

It should be noted that since the sound pickup assembly is mainly used to pick up the user's voice, the ambient sound of the environment where the user is located, etc., for a wearer (e.g., a hearing-impaired person), the sound pickup performance of the sound pickup assembly may affect the clarity, the stability, etc., of the sound received by the wearer through the acoustic device 200. In general, the sound pickup assembly may be disposed at any position of the acoustic device 200. However, the closer the sound pickup assembly is to the speaker assembly, the more susceptible the sound pickup assembly is to the impact of the speaker assembly, and the more likely it will cause "howling" due to the acoustic coupling of the sound pickup assembly and the speaker assembly. Therefore, the setting position of the sound pickup assembly may be determined according to the requirement for the howling threshold of the acoustic device 200. For more information about the relationship between the howling threshold of the sound pickup assembly and its relative position on the acoustic device, please refer to other places in this present disclosure (e.g., see FIG. 7 and the descriptions thereof).

FIG. 3 is a structural diagram of an exemplary ear-hook assembly according to some embodiments of the present disclosure. FIG. 4 is an exploded diagram of the ear-hook assembly in FIG. 3. As shown in FIGS. 3 and 4, the ear-hook assembly 300 may include an ear-hook housing 310, a connection component 320, and a speaker housing 330. One end of the connection component 320 may be connected to the ear-hook housing 310, and the other end of the connection component 320 may be connected to the speaker housing 330.

In some embodiments, the ear-hook housing 310, the connection component 320, and/or the speaker housing 330 may be integrally formed. For example, the connection component 320 may be connected to the ear-hook housing 310 and the speaker housing 330 in an injection molding manner. In some embodiments, the ear-hook housing 310, the connection component 320, and/or the speaker housing 330 may be connected through connection structures to form a foldable ear-hook assembly. Exemplary connection structures may include a snap-fit structure, a plug-in structure, a hinge structure, etc., or any combinations thereof.

In some embodiments, as shown in FIG. 4, the ear-hook housing 310 may include a first ear-hook housing 312 and a second ear-hook housing 314. The first ear-hook housing 312 and the second ear-hook housing 314 may be connected to each other to form an accommodating space 360. The accommodating space 360 may accommodate one or more of a battery assembly, a control circuit assembly, a sound pickup assembly, a channel assembly a Bluetooth assembly, or the like. Merely by way of example, the accommodating space 360 may accommodate the sound pickup assembly 340. In some embodiments, the second ear-hook housing 314 may be physically connected to the connection component 320. For example, the second ear-hook housing 314 may be fixedly connected to one end of the connection component 320 in an injection molding manner. As another example, the second ear-hook housing 314 may be connected to one end of the connection component 320 by welding, riveting, gluing, snap-fitting, or the like. In some embodiments, the first ear-hook housing 312 may be physically connected to the second ear-hook housing 314. For example, the first ear-hook housing 312 may be connected to the second ear-hook housing 314 by welding, riveting, bonding, snap-fitting, or the like. In some embodiments, the first ear-hook housing 312 and the second ear-hook housing 314 may be physically connected to the connection component 320. For example, the first ear-hook housing 312 and the second ear-hook housing 314 may be connected to one end of the connection component 320 in an injection molding manner.

In some embodiments, an accommodating groove (such as the accommodating groove 525 in FIG. 5) for accommodating the sound pickup assembly 340 may be disposed in the accommodating space 360. In some embodiments, the ear-hook housing 310 is disposed with a communication hole 350 that communicates with the accommodating space 360 and the outside space. The sound pickup assembly 340 may be disposed in the accommodating space 360 and adjacent to the communication hole 350, so that the sound pickup assembly 340 may collect sound through the communication hole 350. In some embodiments, a distance between the sound pickup assembly 340 and the communication hole 350 may be not less than 1 mm. For example, the distance between the sound pickup assembly 340 and the communication hole 350 may be 1 mm, 2 mm, 3 mm, 5 mm, 7 mm, 10 mm, or the like. In some embodiments, the communication hole 350 may be disposed on the first ear-hook housing 312 of the ear-hook housing 310. For more descriptions about the first ear-hook housing 312, please refer to other places in this present disclosure (e.g., FIG. 5 and its description).

Generally, the speaker assembly may drive the outside air to vibrate in the process of sound production, that is, the phenomenon of "sound leakage" occurs. Therefore, the communication hole 350 (located in the speaker housing 330) may be disposed on the side of the ear-hook housing 310 away from the speaker assembly (e.g., position C) or on the side away from the connection component 320 (e.g., position D), so as to avoid the "sound leakage" caused by the speaker assembly from being picked up by the sound pickup assembly 340 as much as possible, thereby reducing the interference of the speaker assembly to the sound pickup assembly 340. In addition, the sound pickup assembly 340 is disposed on the side of the accommodating space 360 away from the speaker assembly, which can also reduce the mechanical vibrations generated by the speaker assembly from being transmitted to the sound pickup assembly 340, thereby reducing the occurrence of "howling" or noise generated by the sound pickup assembly 340. It should be noted that, in some embodiments, the position of the communication hole 350 may also be referred to as the position of the corresponding sound pickup assembly. In some embodiments, the communication hole 350 may also be disposed at other positions of the ear-hook housing 310. For example, the communication hole 350 may be disposed on the side of the ear-hook housing 310 facing the speaker assembly, or on the side of the acoustic device (or the ear-hook assembly 300) facing the head of the user when the acoustic device (or the ear-hook assembly 300) is worn, or be disposed on the side (e.g., position O) facing away from the user's head when the acoustic device (the ear-hook assembly 300) is worn. As another example, the communication hole 350 may be disposed at positions B, D, E, etc., on the first ear-hook housing 312.

In some embodiments, as shown in FIG. 4, the connection component 320 may include a first elastic coating layer 321, a second elastic coating layer 322, and an elastic supporting component 323. One end of the elastic supporting component 323 may be connected to the ear-hook housing 310 (e.g., the second ear-hook housing 314), and the other end of the elastic supporting component 323 may be connected to the speaker housing 330 (or speaker assembly). In some embodiments, a wire (not shown) may be disposed in the connection component 320. One end of the wire may be electrically connected to the sound pickup assembly 340, the battery assembly, the control circuit assembly, etc., disposed in the accommodating space 360, and the other end of the wire may be electrically connected to the speaker assembly in the speaker housing 330.

In some embodiments, the first elastic coating layer 321 and the second elastic coating layer 322 may be formed in an injection molding manner (e.g., two-shot injection molding), and wrap the elastic supporting component 323 and the wire. In some embodiments, the elastic supporting component 323 may wrap the wire. In some embodiments, the elastic supporting component 323 may be curved and have a certain rigidity/strength, so as to form the basic shape of the ear-hook assembly 300, thereby facilitating the user to wear the acoustic device. The first elastic coating layer 321 and the second elastic coating layer 322 may protect the elastic supporting component 323 and the wire wrapped therein. In some embodiments, the first elastic coating layer 321 and the second elastic coating layer 322 may be made of soft materials with certain elasticity, such as soft silicone, rubber, fibers, etc., to provide a better tactile feeling for users to wear. In some embodiments, the seams of the first elastic coating layer 321 and the second elastic coating layer 322 may divide the surface of the connection component 320 into inner and outer surfaces that are opposite to each other. The exposed surface of the first elastic coating layer 321 may be used as the inner side of the connection component 320, and the exposed surface of the second elastic coating layer 322 may be used as the outer surface of the connection component 320. It should be noted that when the acoustic device (or the ear-hook assembly 300) is in the wearing state, the inner side of the connection component 320 is closer to the wearer's skin than the outer side. Most of the inner side surface of the connection component 320 is in contact with the user's ear and the head nearby.

In some embodiments, an auxiliary wire may be used when making the connection component 320. The auxiliary wire may be disposed side by side with the elastic supporting component 323. In some embodiments, the auxiliary wire and the elastic supporting component 323 may have the substantially same structural parameters such as shape, length, radius of curvature, or the like. In some embodiments, the diameter of the auxiliary wire may be less than or equal to the diameter of the wire. Further, the elastic coating layer may be formed on the surfaces of the auxiliary wire and the elastic supporting component 323 in an injection molding manner, and then the auxiliary wire is pulled out to obtain the connection component 320. Finally, when making the acoustic device, the wire may be run through the elastic coating layer (i.e., a position where the auxiliary wire used to be). However, in the above injection molding process, since the auxiliary wire and the elastic supporting component 323 have a certain length and radius of curvature, the two (especially the middle area) may deviate from the initial position under the impact of the injection molding material, which eventually leads to uneven wall thickness of the elastic coating layer, which affects the molding quality of the connection component 320. Especially when the designed wall thickness of the elastic coating layer is relatively thin, during the long-term use of the acoustic device, the connection component 320 may have a bad phenomenon of "skin breaking," thereby affecting the user's experience.

In some embodiments, the elastic coating layer may be divided into a first elastic coating layer 321 and a second elastic coating layer 322. The first elastic coating layer 321 and the second elastic coating layer 322 may be injection-molded in two steps. Specifically, a through groove 324 may be formed on one side of one of the elastic coating layers (e.g., the first elastic coating layer 321). The through groove 324 may extend along the extending direction of the first elastic coating layer 321, and may be used for placing the elastic supporting component 323 and the auxiliary wire. Further, the second elastic coating layer 322 may be injection-molded on the side where the through groove 324 of the first elastic coating layer 321 is located, and covers the elastic supporting component 323 and the auxiliary wire, after the first elastic coating layer 321 and the second elastic coating layer 322 are assembled and fixed, the auxiliary wire may be drawn out to form a lead channel disposed in parallel with the elastic supporting component 323 and communicated with the accommodating space 360 (not marked in FIG. 4). The lead channel may be used for routing a wire. It should be noted that since the through groove 324 has a certain depth, the first elastic coating layer 321 may partially wrap the elastic supporting component 323 and the auxiliary wire to limit the position thereof, further, the elastic supporting component 323 and the auxiliary wire may resist the impact of the injection molding material, which is beneficial to improve the problem that the elastic supporting component 323 and the auxiliary wire deviate from the initial position.

In some embodiments, the depth of the through groove 324 may be equal to the radius of the one having the larger diameter among the elastic supporting component 323 and the auxiliary wire. In some embodiments, the depth of the through groove 324 may be greater than the radius of the one having the smaller diameter among the elastic supporting component 323 and the auxiliary wire, and smaller than the radius of the one having the larger diameter among the elastic supporting component 323 and the auxiliary wire. In some embodiments, the depth of the through groove 324 may be greater than the radius of the one having the larger diameter among the elastic supporting component 323 and the auxiliary wire. In some embodiments, the count of the through grooves 324 may be two. The two through grooves 324 may be disposed side by side and are used to place the elastic supporting component 323 and the auxiliary wire, respectively, so that the lead channel and the elastic supporting component 323 are separated from each other. In this way, the elastic supporting component 323 and the auxiliary wire (or wire) do not interfere with each other. In some embodiments, the count of the through grooves 324 may be one, and the elastic supporting component 323 and the auxiliary wire may be jointly accommodated in the through groove 324, so that the elastic supporting component 323 may be exposed to the lead channel, so as to simplify the structure of the connection component 320.

In some embodiments, the ear-hook housing 310 (e.g., the second ear-hook housing 314) may be connected to one end of the connection component 320 (e.g., the elastic supporting component 323) in an injection molding manner. Further, the second elastic coating layer 322 may be connected to the third elastic coating layer 316 that is configured to coat at least part of the outer surface of the ear-hook housing 310 in an injection molding manner. The first elastic coating layer 321 may be between the ear-hook housing 310 and the speaker housing 330 and not cover the outer surface of the ear-hook housing 310. For example, the second elastic coating layer 322 may cover the outer surface of the first ear-hook housing 312, that is, the third elastic coating layer 316 and the second elastic coating layer 322 are the same coating layer, the first elastic coating layer 321 may be located between the first ear-hook housing 312 and the speaker housing 330 and not cover the outer surface of the first ear-hook housing 312.

In some embodiments, the forming process of the ear-hook assembly 300 may include the following operations: operation 1) respectively forming a speaker housing 330 and a second ear-hook housing 314 on both ends of the elastic supporting component 323; operation 2) producing the first elastic coating layer 321 with the through grooves 324 through the first injection molding manner; operation 3) assembling the first elastic coating layer 321 produced in operation 2) with the semi-finished product produced in operation 1) and an auxiliary wire; operation 4) forming the second elastic coating layer 322 on the side where the through groove 324 of the first elastic coating layer 321 is located by means of the second injection molding, and forming the third elastic coating layer 316 on the outer surface side of the second ear-hook housing 314 to wrap the elastic supporting component 323 and the auxiliary wire, and to cover the outer surface of the second ear-hook housing 314; operation 5) pulling out the auxiliary wire of the semi-finished product obtained in operation 4) to form the lead channel, and then threading the wire in the lead channel; operation 6) fixing the first ear-hook housing 312 with the second ear-hook housing 314 produced in operation 5) by one or a combination of adhesive bonding, snap connection, screw connection, etc.

It should be noted that the acoustic device may include two ear-hook assemblies 300, correspondingly, the count of the sound pickup assemblies 340 may also be two, and the count of the channel assemblies may also be two. Specifically, each of the accommodating space 360 of the ear-hook assemblies 300 may be respectively disposed with a sound pickup assembly 340 and a channel assembly, so as to improve the sound pickup performance of each sound pickup assembly 340.

Figure 5:
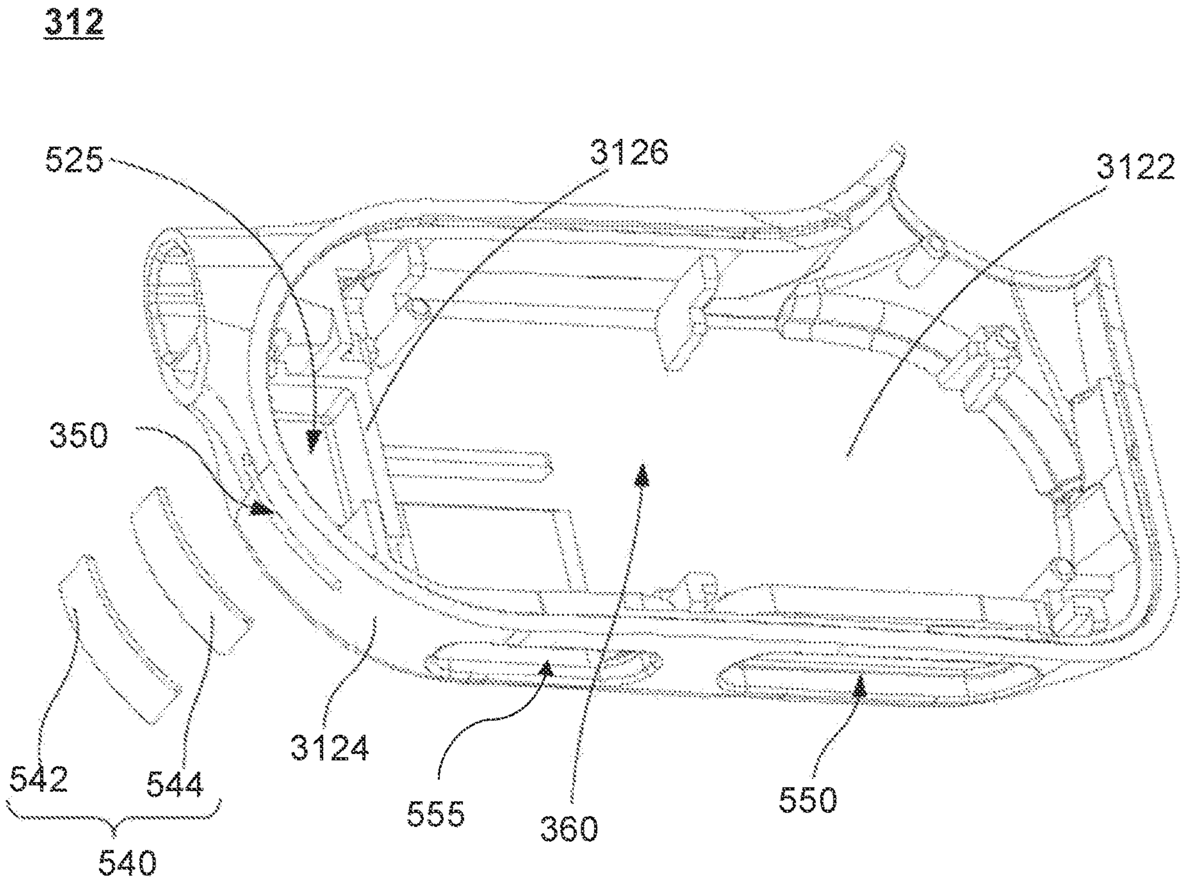
FIG. 5 is a structural diagram of the first ear-hook housing in FIG. 4.

FIG. 5 is a structural diagram of the first ear-hook housing in FIG. 4. As shown in FIG. 5, the first ear-hook housing 312 may include a bottom wall 3122 and a side wall 3124 ringed around the bottom wall 3122. The second ear-hook housing 314 may be covered with the side wall 3124 and disposed opposite to the bottom wall 3122 to form the accommodating space 360. In some embodiments, an accommodating groove 525 for accommodating the sound pickup assembly 340 may be disposed in the accommodating space 360. In some embodiments, a flange 3126 may be protruded from a side of the bottom wall 3122 facing the second ear-hook housing 314. The flange 3126 may enclose the accommodating groove 525 so as to limit and fix the sound pickup assembly 340. In some embodiments, at least a portion of the flange 3126 and the side wall 3124 may collectively define the accommodating groove 525.

In some embodiments, the communication hole 350 may be disposed on the first ear-hook housing 312. In some embodiments, in order to minimize the interference of the speaker assembly to the sound pickup assembly, the communication hole 350 may be disposed on the side wall 3124 at a position away from the speaker assembly (e.g., position C in FIG. 4). In some embodiments, the communication hole 350 may also be disposed on the bottom wall 3122.

It should be noted that if the sound pickup assembly 340 is directly communicated with the outside space through the communication hole 350, a sound path between the sound pickup assembly 340 and the outside space (which may also be referred to as the sound path of the sound pickup assembly 340 for short) will be short. When the acoustic device is in a complex environment (for example, the air flow is relatively strong), the sound pickup assembly 340 picks up more noise, thereby causing the "wind noise" phenomenon. The "wind noise" phenomenon may refer to a phenomenon that the sound pickup assembly 340 picks up the external noise and produces noise. Therefore, according to some embodiments of the present disclosure, a channel assembly (e.g., the channel assembly 600 shown in FIG. 6A) may be disposed between the sound pickup assembly 340 and the communication hole 350 to extend the sound path of the sound pickup assembly 340, thereby improving the sound pickup performance of the sound pickup assembly 340. In some embodiments, the channel assembly may include a first hole (which may also be referred to as a sound inlet hole), a channel, and a second hole (which may also be referred to as a sound outlet hole). In some embodiments, the channel assembly may be disposed in the accommodating space 360 and covered on the flange 3126. In other words, the channel assembly may be covered with the accommodating groove 525, and press the sound pickup assembly 340 in the accommodating groove 525, and the sound inlet hole faces the side wall 3124 and is in butt communication with the communication hole 350, the sound outlet hole is in butt communication with the sound pickup assembly 340. With this arrangement, the channel assembly not only extends the sound path of the sound pickup assembly, but also realizes the fixation of the sound pickup assembly. For more descriptions about the channel assembly, please refer to other places in this present disclosure (e.g., FIG. 6A and its description).

In some embodiments, the communication hole 350 may be a slit having a certain width (e.g., 0.2 mm, 0.5 mm, 1 mm, etc.), so as to increase a contact area between the sound path of the sound pickup assembly 340 and the outside space, and improve the sound pickup performance of the sound pickup assembly 340. In some embodiments, the shape of the communication hole 350 may be a circle, a square, an ellipse, a triangle, or the like. In some embodiments, in order to prevent the reduction of the waterproof and dustproof performance of the ear-hook housing 310 and/or the "wind noise" phenomenon caused by the excessive contact area between the sound path of the sound pickup assembly 340 and the outside space, a protective component 540 may be disposed in the sound path of the sound pickup assembly 340. Merely by way of example, the protective component 540 may be disposed between the channel assembly and the ear-hook housing 310, so as to space the communication hole 350 from the sound inlet hole of the channel assembly, which is used to enhance the windproof and noise reduction capability of the sound pickup assembly 340, and improve the waterproof and dustproof performance of the ear-hook assembly 300. In some embodiments, the protective component 540 may include one or more meshes, e.g., a first mesh 542 and a second mesh 544, that are disposed in layers. In some embodiments, the one or more meshes may be made of different or the same material. In some embodiments, the first mesh 542 may include a metallic mesh (e.g., an iron mesh, an aluminum mesh) and the second mesh 544 may include a non-metallic mesh (e.g., a nylon mesh, a cotton mesh). In some embodiments, the second mesh 544 is closer to the channel assembly than the first mesh 542. In some embodiments, the structural strength of the first mesh 542 may be greater than the structural strength of the second mesh 544. In some embodiments, the mesh number of the second mesh 544 may be greater than the mesh number of the first mesh 542, the combination of the two meshes enables the protective component 540 to take into account its own structural strength, the sound pickup requirements of the sound pickup assembly 340, and the waterproof and dustproof requirements of the ear-hook assembly 300.

In some embodiments, a volume button hole 550 and/or a function button hole 555 may also be disposed on the first ear-hook housing 312. A volume button may be disposed in the volume button hole 550 and exposed through the volume button hole 550, so that the user can control a corresponding processing chip on a circuit board in the acoustic device by pressing/toggling the volume button, and adjust the audio gain of the speaker assembly of the acoustic device. Similarly, a function button may be disposed in the function button hole 555 and exposed through the function button hole 555, so that the user can control a corresponding processing chip on the circuit board in the acoustic device by pressing/toggle the function button, and adjust the corresponding function of the acoustic device. In some embodiments, the function controlled by the function button may include controlling power on/off, controlling pause/play, controlling wireless connection or data transmission, etc., or any combination thereof.

Figure 6A:
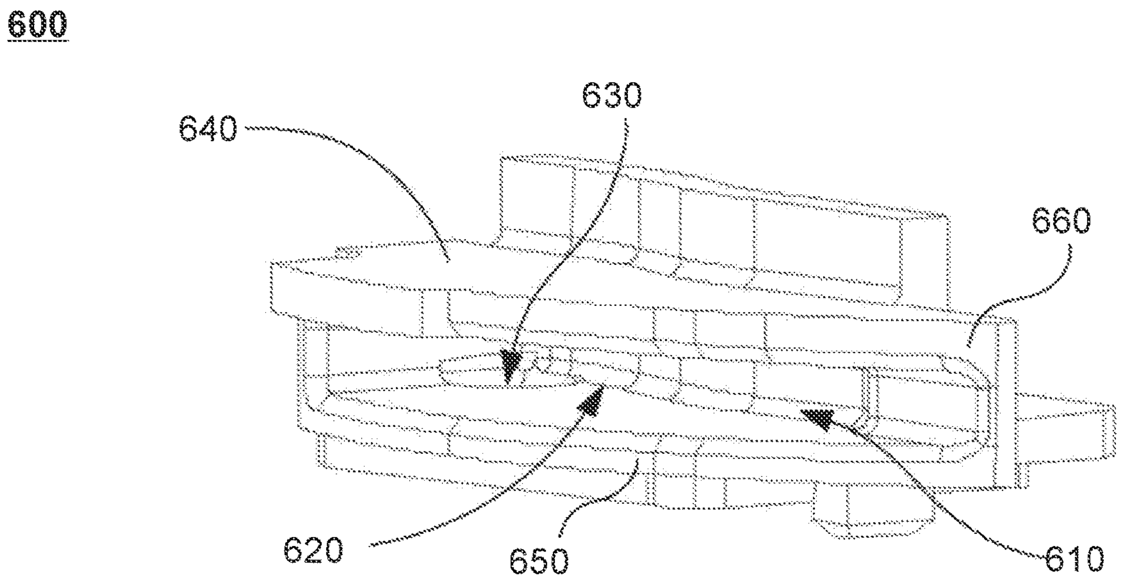
FIG. 6A is a structural diagram of a channel assembly according to some embodiments of the present disclosure.
Figure 6B:
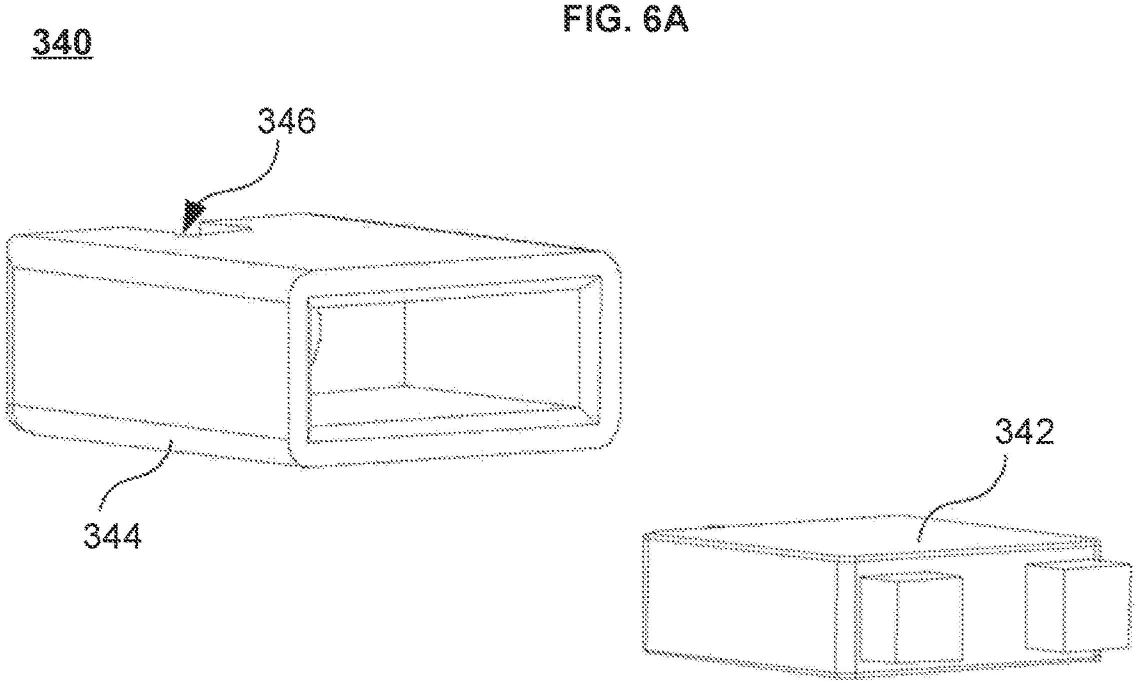
FIG. 6B is a structural diagram of the sound pickup assembly in FIG. 3.

FIG. 6A is a structural diagram of a channel assembly according to some embodiments of the present disclosure. FIG. 6B is a structural diagram of the sound pickup assembly in FIG. 3. As shown in FIG. 6A, the channel assembly 600 may include a first hole 610 (which may also be referred to as a sound inlet hole), a channel 620, and a second hole 630 (which may also be referred to as a sound outlet hole). The sound inlet hole 610 and the sound outlet hole 630 may be disposed at intervals and communicate with the channel 620 respectively. The sound inlet hole 610 may be in butt communication with a communication hole on the ear-hook assembly (e.g., the communication hole 350 on the ear-hook assembly 300). The sound outlet hole 630 may be disposed adjacent to the sound pickup assembly 340 so that the sound may be transmitted to the sound pickup assembly 340 through the communication hole, the sound inlet hole 610, the channel 620, and the sound outlet hole 630 in sequence.

In some embodiments, the shape of the sound inlet hole 610 may be the same as or similar to the shape of the communication hole. For example, when the communication hole is a slit with a certain width, the sound inlet hole 610 may be provided as a slit. As another example, when the communication hole is disposed in a shape of a circular hole, the sound inlet hole 610 may be disposed in the shape of an oval hole or a circular hole.

In some embodiments, the channel 620 may include a channel top wall 640, a channel bottom wall 650, and a channel side wall 660. The channel top wall 640 and the channel bottom wall 650 may be located at two ends of the channel side wall 660, respectively. Specifically, the channel top wall 640 and the channel bottom wall 650 may be disposed opposite to each other, and the channel side wall 660 may be connected between the channel top wall 640 and the channel bottom wall 650. In some embodiments, the length of the channel 620 in a direction connecting the channel top wall 640 and the channel bottom wall 650 may be in a range from 0.45-0.75 mm. For example, the length of the channel 620 in the direction connecting the channel top wall 640 and the channel bottom wall 650 may be 0.45 mm, 0.5 mm, 0.55 mm, 0.6 mm, 0.65 mm, 0.7 mm, 0.75 mm, etc. In some embodiments, when the channel assembly 600 is pressed on the sound pickup assembly 340, specifically, the channel bottom wall 650 may press the sound pickup assembly 340. Merely by way of example, the channel top wall 640 and the channel bottom wall 650 are disposed in parallel and spaced apart, so that the channel 620 is disposed in a flat shape to adapt to the flat structure of the housing.

In some embodiments, the sound inlet hole 610 may be disposed on the side wall 660 or the top wall 640 of the channel, and the sound outlet hole 630 may be disposed on the channel bottom wall 650. In some embodiments, a distance between the sound inlet hole 610 and the sound outlet hole 630 along the channel 620 may be greater than or equal to 4 mm, so as to extend the sound path of the sound pickup assembly 340. For example, the distance between the sound inlet hole 610 and the sound outlet hole 630 along the channel 620 may be 4 mm, 4.5 mm, 5 mm, 5.5 mm, 6 mm, 8 mm, 10 mm, or the like. In some embodiments, the channel assembly 600 may be a tubular structure with openings at both ends, which is composed of only a side wall. An opening at one end of the tubular structure may be the sound inlet hole, and the opening at the other end of the tubular structure may be the sound outlet hole.

In some embodiments, as shown in FIG. 6B, the sound pickup assembly 340 may include a sound pickup element 342 and a protective cover 344. The protective cover 344 may be sleeved on the outer periphery of the sound pickup element 342. In some embodiments, the protective cover 344 may be disposed with a groove 346 facing the channel bottom wall 650, and the sound pickup element 342 is at least partially located in the groove 346. In this way, when the channel assembly 600 (e.g., the channel bottom wall 650 of the channel assembly 600) presses the sound pickup assembly 340 in the accommodating groove 525 (i.e., the channel assembly 600 is covered on the sound pickup assembly 340), the protective cover 344 may abut against the side wall (e.g., the flange 3126) of the accommodating groove 525 and fit with the side wall of the accommodating groove 525, the groove 346 and the sound outlet hole 630 may be in butt communication, so that the picked up sound may enter the sound pickup element 342 through the sound outlet hole 630 and the groove 346. It should be noted that, in the present disclosure, the abutment of the protective cover 344 with the side wall of the accommodating groove 525 means that there is a force between the protective cover 344 and the side wall of the accommodating groove 525. Therefore, the protective cover 344 and the side wall of the accommodating groove 525 may be closely attached. In some embodiments, the protective cover 344 may have the elasticity (e.g., a silicone cover), so that the protective cover 344 may be elastically deformed during the assembly process of the acoustic device, so as to increase the fixing effect of the side wall of the accommodating groove 525 on the sound pickup assembly 340, and increase the sealing performance of the sound path between the sound pickup assembly 340 and the channel assembly 600, thereby improving the sound pickup performance of the sound pickup assembly 340. In some embodiments, the protective cover 344 and the sound pickup element 342 may be tightly fitted, a sound pickup part (e.g., a diaphragm) of the sound pickup element 342 may be exposed to the groove 346, so that after the sound is transmitted to the groove 346, the sound is not easy to leak from a slit between the protective cover 344 and the sound pickup element 342 to the rear side of the sound pickup element 342, thereby better maintaining the sound pickup performance of the sound pickup element 342.

Figure 7:
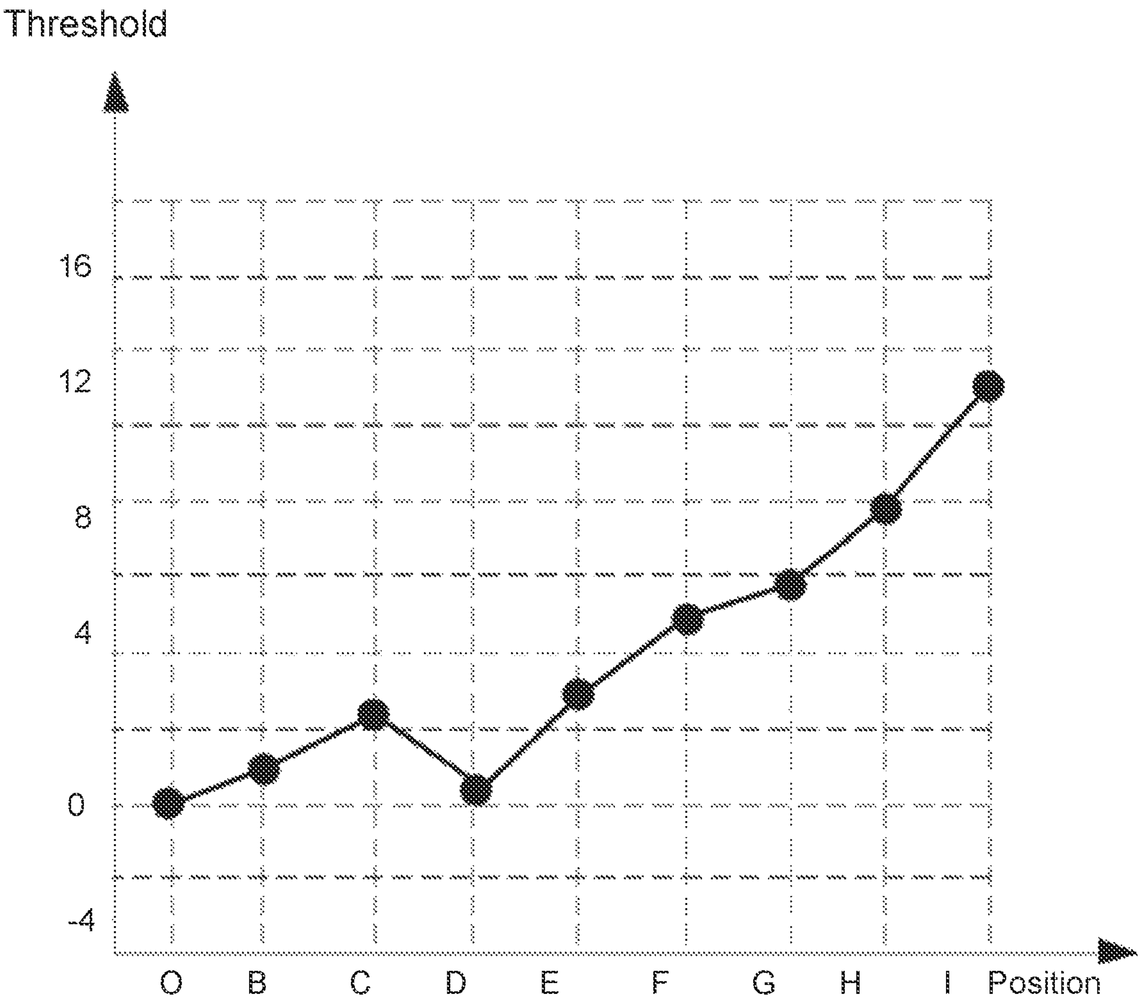
FIG. 7 is a diagram illustrating a relationship between a howling threshold and a position of a sound pickup assembly in an acoustic device according to some embodiments of the present disclosure.

FIG. 7 is a diagram illustrating a relationship between a howling threshold and a position of a sound pickup assembly in an acoustic device according to some embodiments of the present disclosure. As shown in FIG. 7, the abscissa may represent the position of the sound pickup assembly (or the communication hole corresponding to the sound pickup assembly) in the acoustic device, and the ordinate may indicate the howling threshold of the sound pickup assembly (the unit is dB). It should be noted that the greater the howling threshold of the sound pickup assembly, the lower the probability of the "howling" phenomenon of the sound pickup assembly, and the less the sound pickup assembly is affected by the speaker assembly.

In FIG. 7, positions O, B, C, D, E, F, G, H, and I indicate that the sound pickup assemblies are disposed at positions O, B, C, D, E, F, G, H, and I in FIG. 2 or FIG. 4. The ear-hook assembly 300 in FIG. 4 may be an exemplary structure of the ear-hook assemblies 212 and/or 214 of the acoustic device in FIG. 2. As shown in FIGS. 2 and 4, when the acoustic device is in the wearing state, the position O is located on the outer side of the ear-hook assembly 300 away from the head of the user. The positions B and E are located at an upper side of the ear-hook housing 310 of the ear-hook assembly 300, and the position E is farther away from the speaker assembly than the position B. The position D is located at a lower side of the ear-hook housing 310, and the position C is located at a rear side of the ear-hook housing 310 away from the speaker assembly. Further, for the rear-hook assembly, in conjunction with FIG. 2, the positions F, G, H, and I are in turn away from the speaker assembly 232 and/or 234. The position I may correspond to the middle position of the rear-hook assembly 216.

The howling threshold corresponding to the position O may be used as the reference threshold, that is, the howling threshold value of the position O is defined as 0. As shown in FIG. 7, the howling thresholds of positions B, C, D, E, F, G, H, and I are all greater than 0, which indicates that the placement of the sound pickup assembly in these positions is beneficial to weaken the "howling" phenomenon. Further, the howling thresholds of positions F, G, H, and I are significantly higher than those of positions B, C, D, and E, which indicates that it is more conducive to weaken the "howling" phenomenon when the sound pickup assembly is disposed on the rear-hook assembly. It should be noted that for the ear-hook housing, the howling thresholds of positions C and E are also significantly higher than those of positions B and D, which indicates that the farther the sound pickup assembly disposed on the ear-hook housing away from the speaker assembly, the more beneficial to weaken the "howling" phenomenon. For position E, there may be structural interference between the ear-hook assembly and the rear-hook assembly, so it is preferable to set the sound pickup assembly at the position C on the ear-hook assembly.

Figure 8:
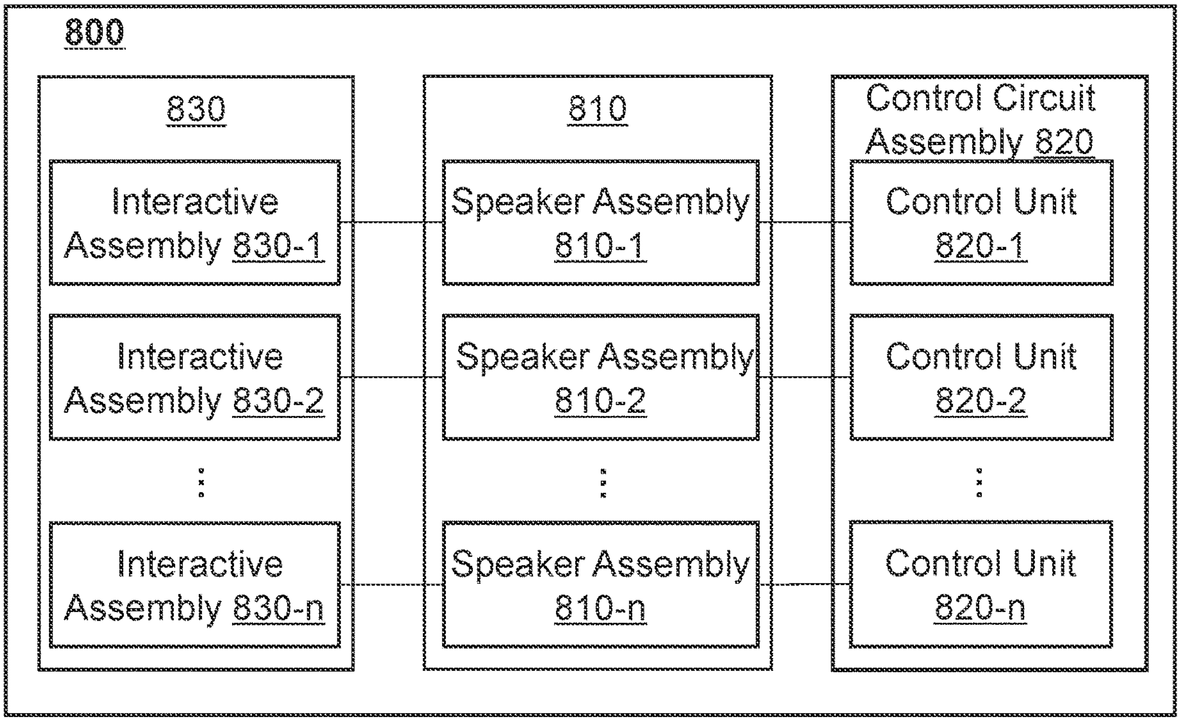
FIG. 8 is a block diagram illustrating an exemplary acoustic device according to some embodiments of the present disclosure.

FIG. 8 is a block diagram illustrating an exemplary acoustic device according to some embodiments of the present disclosure. As shown in FIG. 8, the acoustic device 800 may include multiple speaker assemblies 810 (e.g., speaker assemblies 810-1, 810-2), a control circuit assembly 820, and multiple interactive assemblies 830 (e.g., interactive assemblies 830-1, 830-2).

The speaker assembly 810 may be used to convert an audio signal (e.g., an electrical signal) into a mechanical vibration signal. For example, the speaker assembly 810 may receive an audio signal from a microphone, a cell phone, an MP3 player, etc., and convert it into a mechanical vibration signal, thereby producing a sound. In some embodiments, the speaker assembly 810 may include a bone conduction speaker, an air conduction speaker, or the like, or combinations thereof. Merely by way of example, the speaker assembly 810 may be a bone conduction speaker. The bone conduction speaker may include a magnetic circuit assembly, a vibration assembly, and a speaker housing. The magnetic circuit assembly may be used to provide a magnetic field. When the vibration assembly receives the audio signal, the vibration assembly may convert the audio signal into the mechanical vibration signal under the action of the magnetic field. For example, the vibration assembly may include a voice coil and a vibration plate. The voice coil is disposed in a magnetic gap formed by the magnetic circuit assembly. The voice coil vibrates under the action of the magnetic field after the speaker assembly 810 receives the electrical signal (i.e., the audio signal). The voice coil is physically connected to the vibration plate and transmits vibrations to the vibration plate. The speaker housing may include a vibration panel (i.e., a vibration transfer plate) facing the user's body. The speaker housing may accommodate the vibration assembly. In some embodiments, the vibration assembly may be physically connected to the vibration panel and drive the vibration panel vibrate, so as to transmit the vibration to the user's auditory nerve via the user's head, thereby allowing the user to hear the sound.

In some embodiments, the multiple speaker assemblies 810 may provide various resonance peaks. For example, the multiple speaker assembles 810 may provide a resonance peak with a frequency lower than 500 Hz, or lower than 1000 Hz, or higher than 5000 Hz. In some embodiments, the speaker assemblies 810 may include various types, e.g., electromagnetic (e.g., moving coil, moving iron, etc.), piezoelectric, inverse piezoelectric, electrostatic, etc., which is not limited in this present disclosure.

The control circuit assembly 820 may be used to control other assemblies of the acoustic device 800 (e.g., the speaker assemblies 810) to implement one or more functions of the acoustic device 800. In some embodiments, the control circuit assembly 820 may include multiple control elements (e.g., the control elements 820-1, 820-2, etc.). Each control element may correspondingly control at least one speaker assembly to independently control the speaker assembly, e.g., independently control the audio gain of the corresponding speaker assembly. In some embodiments, the control circuit assembly 820 may further include one or more function buttons to control the acoustic device 800 to be turned on/off, paused/played, wirelessly connected/disconnected, or the like. For more descriptions about the control circuit assembly, please refer to other places in the present disclosure (e.g., FIG. 9 and its description).

The interactive assembly 830 may be used to enable the interaction between a user and the acoustic device 800. For example, the interactive assembly 830 may be used to implement the interaction between the user and the speaker assembly 810 and the control circuit assembly 820. Further, the interactive assembly 830 may trigger the control circuit assembly 820 to control the acoustic device 800 to implement the function corresponding to a user operation instruction in response to receiving the user operation instruction. For example, the interactive assembly 830 may control the control circuit assembly 820 to power on/off the acoustic device 800 in response to receiving a pressing instruction from the user. As another example, each interactive assembly may correspond to a speaker assembly and its corresponding control element. Further, each interactive assembly may be used to trigger the control element in the control circuit assembly 820 to control the corresponding speaker assembly 810 to realize the function corresponding to the user operation instruction in response to receiving the user operation instruction. For example, the interactive assembly 830-1 may control the control element 820-1 to increase or decrease the audio gain of the speaker assembly 810-1 in response to receiving a press or toggle command from the user.

In some embodiments, the interactive assembly 830 may include one or more third holes disposed on a supporting assembly (e.g., an ear-hook assembly) of the acoustic device 800 and first components respectively disposed in the third holes and configured to trigger the control circuit assembly 820 (e.g., a control element) to control one or more functions of the acoustic device 800. The first component may be used to receive a user operation instruction. In some embodiments, the user instruction may be embodied in the form of a force, a sound, or the like. For example, the user may generate the user operation instruction by pressing, dialing, or the like. As another example, the first component may be a sound sensor, and the sound sensor may receive a user's voice to generate a user operation instruction. In some embodiments, the first component may include one or more buttons, e.g., a volume button and a function button. In some embodiments, the control circuit assembly 820 (e.g., each control element) may include a second component. The second component may trigger the control circuit assembly 820 to implement functions corresponding to the operation instructions, such as volume increase/decrease, play/pause, power on/off, etc., in response to a user operation instruction (e.g., press, touch) received by the first component. In some embodiments, the second component may include a functional switch, such as a mechanical switch, a voice-activated switch, or the like. For example, one side of the first component may be provided with a switch accommodating area. The switch accommodating area may be used for accommodating the function switch, so that the first component may toggle the function switch when receiving the user's operation instruction (e.g., toggle), thereby triggering the control element in the control circuit assembly 820 to implement the corresponding instruction function. As another example, the second component may trigger the function switch in response to a sound of a certain intensity to realize the function corresponding to the second component.

Figure 9:
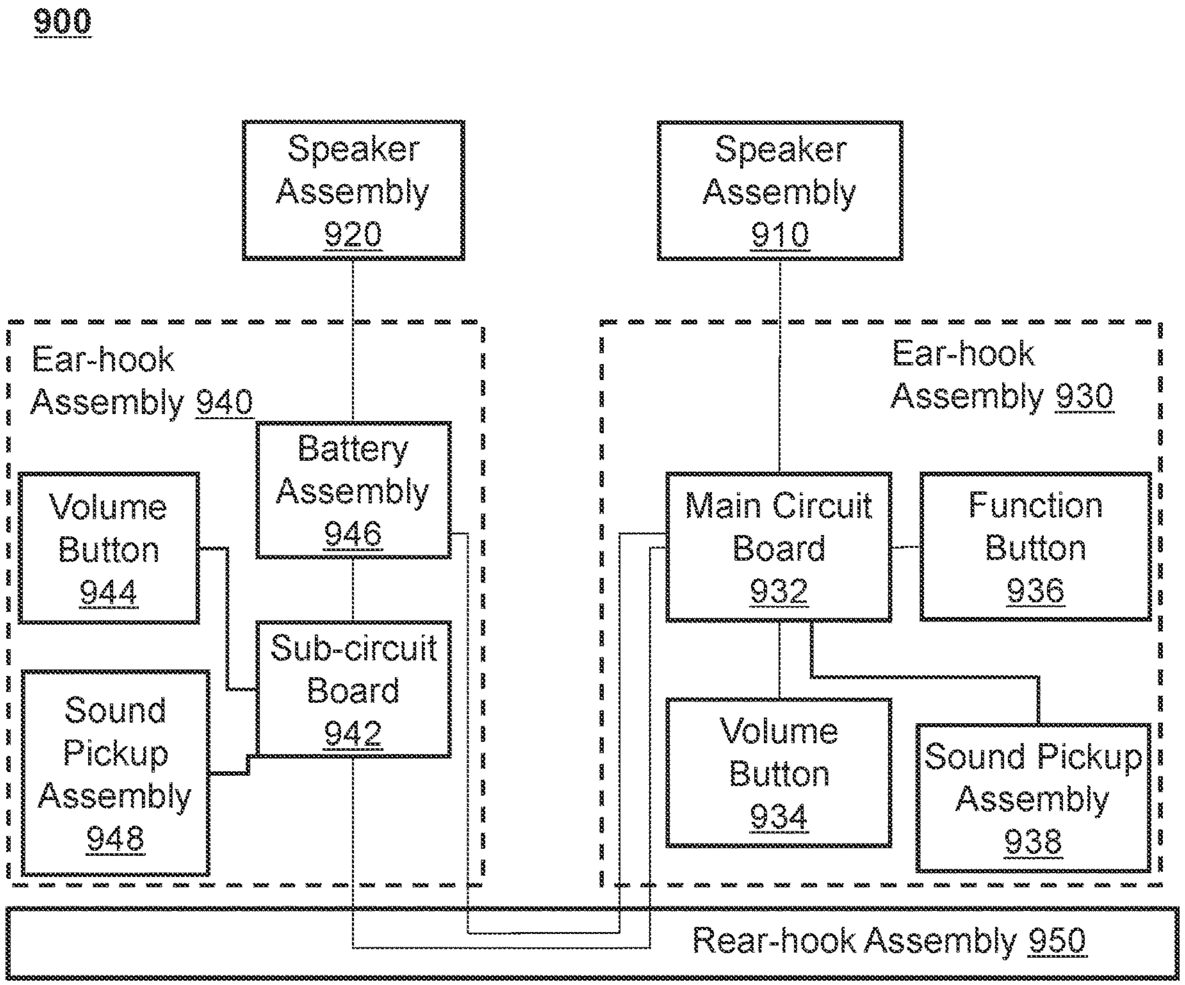
FIG. 9 is a structural diagram illustrating an exemplary acoustic device according to some embodiments of the present disclosure.

FIG. 9 is a structural diagram of an exemplary acoustic device according to some embodiments of the present disclosure. As shown in FIG. 9, the acoustic device 900 may include a speaker assembly 910, a speaker assembly 920, an ear-hook assembly 930, an ear-hook assembly 940, and a rear-hook assembly 950. It should be noted that a part of the housing and the various assemblies accommodated in the corresponding accommodating space may be collectively referred to as a housing assembly. Specifically, two ends of the rear-hook assembly 950 may be respectively provided with the ear-hook assemblies 930 and 940 and the corresponding speaker assemblies 910 and 920. In some embodiments, various electrical elements (such as a sound pickup assembly, a speaker assembly, etc.) at both ends of the rear-hook assembly 950 may be electrically connected through a wire built into the rear-hook assembly 950 to realize the transmission of control instructions, power, etc.

In some embodiments, the ear-hook assembly 930 may include a main circuit board 932, a volume button 934, a function button 936, a sound pickup assembly 938, etc., or any combination thereof. The ear-hook assembly 940 may include a sub-circuit board 942, a volume button 944, a battery assembly 946, a sound pickup assembly 948, etc., or any combination thereof. In some embodiments, the main circuit board 932 may be accommodated in the accommodating space of the ear-hook assembly 930, and the battery assembly 946 may be accommodated in the accommodating space of the ear-hook assembly 940, so as to balance the weight distribution of the acoustic device 900.

In some embodiments, two independent audio processing chips (also referred to as control elements) may be integrated on the main circuit board 932 to independently control the audio gains of the two speaker assemblies 910 and 920 respectively. In some embodiments, an audio processing chip for controlling the speaker assembly 910 may be integrated on the main circuit board 932 to individually control the audio gain of the speaker assembly 910, and an audio processing chip for controlling the speaker assembly 920 may be integrated on the sub-circuit board 942 so as to individually control the audio gain of the speaker assembly 920. Merely by way of example, the audio processing chip may be a digital signal process (DSP) chip.

In some embodiments, the user may control the two speaker assemblies 910 and 920 via the two volume buttons 934 and 944, respectively. For example, a volume button hole that communicates with the accommodating space may be formed on the ear-hook housing corresponding to each ear-hook assembly. Each volume button 934 or 944 is correspondingly disposed in the volume button hole of the ear-hook housing, and is exposed through the volume button hole, so that the user can control the corresponding audio processing chip by pressing or turning the volume button, in turn, the audio gain of the corresponding speaker assembly is adjusted.

In some embodiments, the volume button 934 and the volume button 944 may be referred to as interactive assemblies. In some embodiments, the interactive assembly (the volume button 934 and the volume button 944) and the main circuit board 932 may be collectively referred to as the control circuit assembly. In this case, two mutually independent audio processing chips may be integrated on the main circuit board 932. In some embodiments, the control circuit assembly may also include a sub-circuit board 942. In some embodiments, the main circuit board 932 and the sub-circuit board 942 may be located in corresponding accommodating spaces of different ear-hook housings. For example, the main circuit board 932 may be coupled with the volume button 934 and cover the volume button hole corresponding to the volume button 934 so as to withstand the pressing force applied by the user to the volume button 934. Similarly, the sub-circuit board 942 may be coupled with the volume button 944 and cover the volume button hole corresponding to the volume button 944 so as to withstand the pressing force exerted by the user on the volume button 944. In the present disclosure, the coupling between two elements may refer to direct connection or indirect connection. In some embodiments, the sub-circuit board 942 may also be electrically connected to the main circuit board 932, so that the main circuit board 932 may process the pressing operation of the volume button 944 coupled to the sub-circuit board 942. In some embodiments, the sub-circuit board 942 and the battery assembly 946 may be disposed in the same accommodating space of the ear-hook housing.

In some embodiments, the control circuit assembly may also include a function button 936. The function button 936 may be coupled to the main circuit board 932. In some embodiments, since the main circuit board 932 is generally smaller in volume than the battery assembly 946, the function button 936 may be disposed in the ear-hook housing on one side where the main circuit board 932 is located so as to balance the volume distribution of the acoustic device 900. In some embodiments, the function button 936 may replace the volume button 934 or coexist with the volume button 934.

In some embodiments, the function button 936 may implement functions such as play/pause, power on/off, etc., so as to expand the interactive capability of the acoustic device 900 with the user.

It should be noted that the above description of acoustic device 900 is intended to be illustrative, not to limit the scope of the present disclosure. Numerous alternatives, modifications and variations will be apparent to those of ordinary skill in the art. The features, structures, methods, and other features of the exemplary embodiments described herein may be combined in various ways to obtain additional and/or alternative exemplary embodiments. For example, the acoustic device 900 may further include a waterproof backing plate for improving the waterproof and dustproof performance of the acoustic device 900. As another example, the acoustic device 900 may further include a Bluetooth assembly, a channel assembly, or the like.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic device comprising:

a housing having an accommodating space and one or more communication holes, each communication hole communicating the accommodating space and an outside space;

one or more sound pickup assemblies disposed in the accommodating space and configured to pick up a sound through the one or more communication holes;

one or more channel assemblies disposed in the accommodating space, wherein at least one of the one or more channel assemblies is disposed between one sound pickup assembly of the one or more pickup sound assemblies and one communication hole of the one or more communication holes, so that the sound is transmitted to the sound pickup assembly through the at least one of the one or more channel assemblies after passing through the communication hole;

multiple speaker assemblies;

a control circuit assembly comprising multiple control elements, wherein each control element corresponds to at least one speaker assembly of the multiple speaker assemblies, and the at least one of the one or more communication holes is disposed on a side of the housing away from the at least one speaker assembly of the multiple speaker assemblies; and multiple interactive assemblies, wherein each interactive assembly corresponds to one of the multiple speaker assemblies and the corresponding control element of the speaker assembly, the interactive assembly is configured to trigger the control element corresponding to the interactive assembly to control the corresponding speaker assembly to implement a function corresponding to a user operation instruction in response to receiving the user operation instruction.

2. The acoustic device of claim 1, wherein the at least one of the one or more channel assemblies includes a first hole, a channel, and a second hole, the first hole is in butt communication with the communication hole, the second hole is disposed adjacent to the sound pickup assembly so that the sound is transmitted to the sound pickup assembly through the communication hole, the first hole, the channel, and the second hole in sequence.

3. The acoustic device of claim 2, wherein an accommodating groove is disposed in the accommodating space for accommodating at least one of the one or more sound pickup assemblies, the at least one of the one or more channel assemblies presses the at least one of the one or more sound pickup assemblies in the accommodating groove.

4. The acoustic device of claim 3, wherein the housing includes a first housing and a second housing, and the first housing and the second housing are matched and connected to form the accommodating space;

the second housing includes a bottom wall and a side wall ringed around the bottom wall;

the first housing is physically connected to the side wall to form the accommodating space; and the bottom wall protrudes toward one side of the first housing and is provided with a flange surrounding the accommodating groove, the at least one of the one or more channel assemblies is covered on the flange to hold the sound pickup assembly in the accommodating groove.

5. The acoustic device of claim 4, wherein the channel includes a channel top wall, a channel bottom wall, and a channel side wall, the channel top wall and the channel bottom wall are respectively located at two ends of the channel side wall;

the first hole is disposed on the channel side wall or the channel top wall;

the second hole is disposed on the channel bottom wall; and the channel bottom wall is configured to press and hold the sound pickup assembly.

6. The acoustic device of claim 5, wherein the sound pickup assembly comprises a sound pickup element and a protective cover, the protective cover is sleeved on the outer periphery of the sound pickup element, wherein the protective cover is provided with a groove facing the channel bottom wall;

the sound pickup element is at least partially located in the groove; and the protective cover abuts and fits with the flange.

7. The acoustic device of claim 5, wherein a length of the channel in a direction connecting the channel top wall and the channel bottom wall is in a range of 0.45-0.75 mm.

8. The acoustic device of claim 3, wherein a distance from the first hole to the second hole along the channel is greater than or equal to 4 mm.

9. The acoustic device of claim 3, wherein the first hole has a same shape as the communication hole.

10. The acoustic device of claim 3, further comprising a protective component disposed between the at least one of the one or more channel assemblies and the housing to space the communication hole and the first hole apart.

11. The acoustic device of claim 10, wherein the protective component includes a first mesh and a second mesh disposed in a stack, the second mesh being closer to the at least one of the one or more channel assemblies than the first mesh.

12. The acoustic device of claim 1, wherein the function includes that each control element of the multiple control elements independently controls an audio gain of its corresponding speaker assembly.

13. The acoustic device of claim 12, wherein the interactive assembly includes one or more third holes disposed on the housing and buttons disposed in the one or more third holes respectively, and the buttons are configured to trigger the control element to adjust the audio gain of the corresponding speaker assembly.

14. The acoustic device of claim 1, wherein the housing includes a first part and a second part, and one end of the first part and one end of the second part are respectively connected to one speaker assembly;

the control circuit assembly includes a main circuit board, the control element is integrated on the main circuit board, and the main circuit board is accommodated in an accommodating space corresponding to an ear-hook housing; and the control circuit assembly further includes a sub-circuit board, the sub-circuit board is disposed in an accommodating space corresponding to the other ear-hook housing and covers a corresponding volume button hole.

15. The acoustic device of claim 14, wherein the housing further comprises a third part, the third part is connected between the first part and the second part, the one or more sound pickup assemblies are respectively disposed in at least two corresponding accommodating spaces of the first part, the second part, and the third part; or the one or more sound pickup assemblies are disposed in a corresponding accommodating space of the third part at intervals.

16. The acoustic device of claim 15, wherein the one or more sound pickup assemblies are disposed in the corresponding accommodation space of the third part, one of the one or more sound pickup assemblies is disposed at a middle position of the corresponding accommodating space of the third part, and the remaining sound pickup assemblies are spaced on one side or both sides of the middle position.

17. The acoustic device of claim 16, wherein the one or more sound pickup assemblies include two sound pickup assemblies and the one or more channel assemblies include two channel assemblies, wherein the two sound pickup assemblies and the two channel assemblies are respectively disposed in the two ear-hook housings.

* * * * *